Mar. 27, 1923.
B F. C. MORRIS
ANIMAL POKE
Filed June 2, 1921
1,449,535
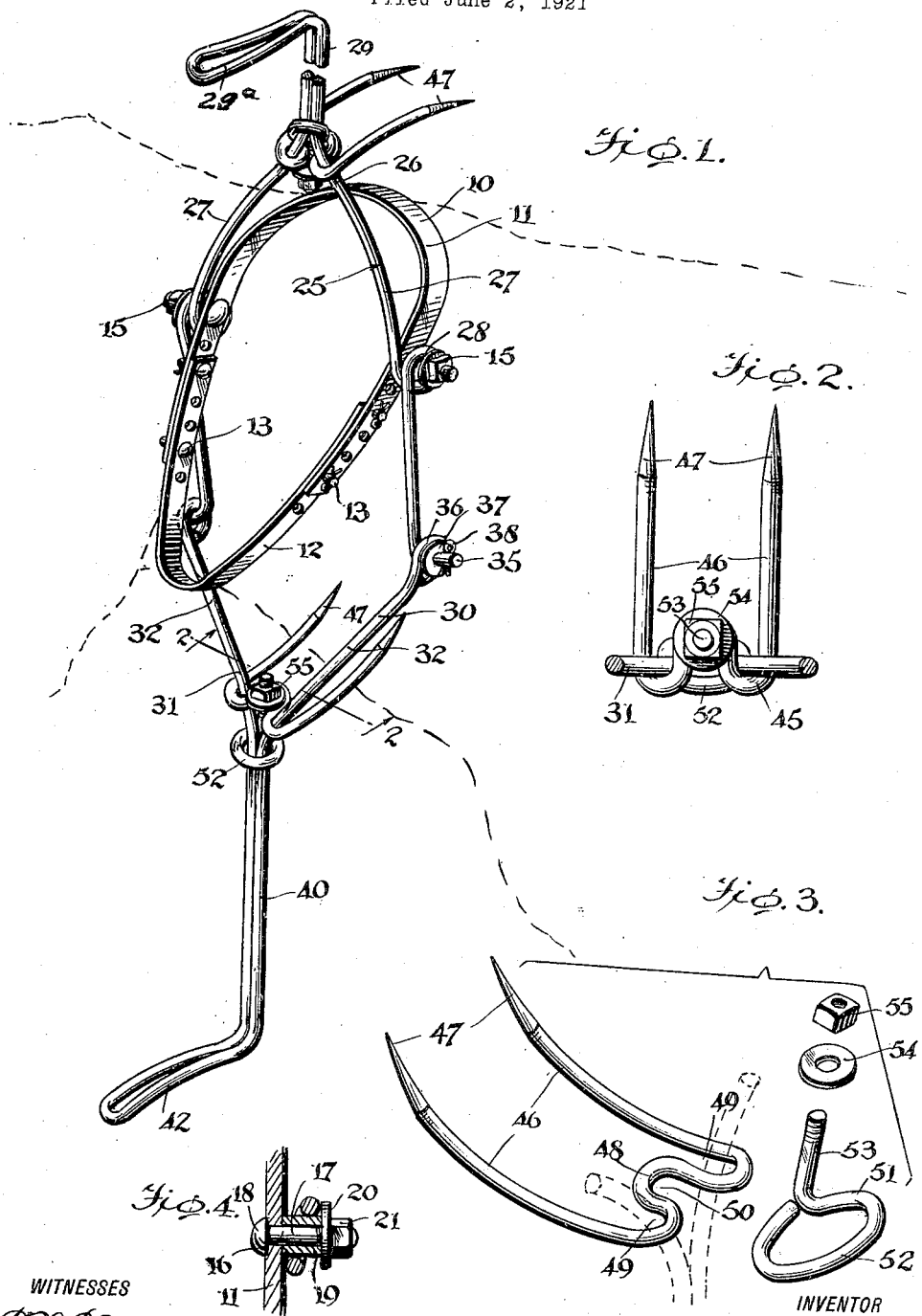
WITNESSES
INVENTOR
B. F. C. MORRIS
BY
ATTORNEYS Patented Mar. 27, 1923.

1,449,535

UNITED STATES PATENT OFFICE.

B FREDERICK C. MORRIS, OF OKLAHOMA, OKLAHOMA.

ANIMAL POKE.

Application filed June 2, 1921. Serial No. 474,547.

*To all whom it may concern:*

Be it known that I, B FREDERICK C. MORRIS, a citizen of the United States, and a resident of the city of Oklahoma and State of Oklahoma, have invented certain new and useful Improvements in Animal Pokes, of which the following is a specification.

The present invention relates to an improvement in animal pokes, and has for its object to provide a device of this character which is adaptable to various animals, which can be worn by the animal when not in operation with ease and comfort and without irritation, and which when in operation is effective to properly retard and restrain the animal and which is of simple and durable construction, reliable in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a perspective view, illustrating the invention in use;

Figure 2 is a transverse sectional view on line 2—2 of Figure 1;

Figure 3 is a detail perspective view of the detachable prong and its securing means; and Figure 4 is a detail view in section of one of the pivot bearings of the yoke.

Referring to the drawings wherein for the sake of illustration is shown the preferred embodiment of the invention, the numeral 10 designates generally a collar which includes an upper section 11 and a lower section 12 which fit about the neck of the animal and the ends of which overlap and are adjustably secured to each other and on the neck of the animal by fastening means 13.

Pivot bearings designated generally at 15 are carried by the opposite sides of the upper section 11 of the collar and are alined so as to lie substantially in the same horizontal plane. As clearly shown in Figure 4, each pivot bearing includes a bolt 16 having a shank 17 extending through a suitable opening provided in the adjacent portion of the section 11 and a rounded head 18 bearing against the under side of the section that is against the side next the animal. The outwardly projecting portion of the shank 17 carries a sleeve 19 and a washer 20 abuts the outer end of the sleeve and is secured in position by means of the nut 21 threaded on the outer end of the shank.

An upper swinging yoke 25 including a body 26 and arms 27 is swingably mounted upon the pivot bearings 15, the arms 27 having eyes 28 formed intermediate their ends and operatively arranged on the sleeves 19 for this purpose. It is to be understood that the washers 20 and nuts 21 prevent lateral displacement of this eye from the pivot bearings after they have been mounted thereon. The body portion 26 of the upper yoke is provided with an extension 29 having an angular extremity 29ª.

A lower yoke 30 comprising a body portion 31 and arms 32 is pivotally suspended upon the upper yoke. Preferably the means which is provided for pivotally suspending the lower yoke upon the upper yoke includes journal pins 35 which may be integrally formed at the arms 27 of the upper yoke and eyes 36 integrally formed with the arms 32 and operatively arranged on the journal pins 35. A washer 37 and cotter pin 38 prevent endwise displacement of the eyes 36. The body portion 31 of the lower yoke 30 is provided with an extension 40 having an angular extremity 41.

Detachable spurs are carried by the upper and lower yoke and as they are identical in construction and relation with respect to the yokes with which they are associated a common description will serve for both. Each detachable spur includes a body portion 45 and arms 46 having their outer ends milled to provide points 47. Between the arms 46 the body portion 45 is formed with a U-shaped bend 48 defining sockets 49 and 50. When associated with the yoke the sockets 49 receive the arms of the yoke as clearly shown in the drawings. Securing means is provided for releasably maintaining the detachable prong in position on its yoke and includes an eye bolt 51 having an eye 52 which slidably embraces the extension of the body of the yoke and a shank 53 which is received in and extends through the socket 50. A washer 54 is received on the free end of the shank and a nut 55 which is threaded on this end of the shank cooperates with the washer and shank to complete the securing action. It is to be noted that the curved bend 48 thus constitutes a seat for the nut and washer. The eye bolt is preferably constructed of resilient material and may thus be readily associated with the extension of the yoke either by passing it over the angular extremity 41 or by bending it around the extension 40 when the angular extremity is constructed to prevent the sliding of the eye thereover. When the eye bolt is assembled with the detachable prong and the nut and washer the sockets 49 receive the arms of the yoke, the socket 50 receives the shank of the eye bolt and the incurved bend constitutes a seat for the nut and washer. As the nut is turned home against its seat it draws the eye bolt upwardly and the detachable prongs downwardly so as to firmly seat and bind the arms of the yoke in the sockets whereby the detachable prong is secured against displacement in one direction, the shank of the eye bolt and the nut and eye thereof preventing displacement in all other directions.

In use, the upper and lower yokes are freely pivoted or suspended and when a yoke or its angular extremity is engaged the prong or spur of the yoke is immediately forced into contact with the animal to properly restrain or retard the animal. This pivotal suspension of the yokes is brought about by the pivot bearings 15 as the sleeves thereof minimize friction and the entire bearing functions to most freely pivot this upper yoke. The lower yoke is also freely pivoted as the eyes which it carries are freely swingable on the journal pins of the upper yoke.

I claim:

1. In an animal poke, an adjustable collar, pivot bearings carried by the collar, and including a bolt having an outwardly extending shank, a sleeve on said shank, a washer abutting said sleeve, and a nut threaded on the shank and engaging said washer, an upper yoke including a body portion, and arms provided with eyes intermediate their ends, operatively arranged on the sleeves of said pivot bearings, a lower yoke including a body and arms, means for pivotally suspending the lower yoke on the upper yoke including journal pins carried by the arms of the upper yoke and eyes carried by the arms of the lower yoke and operatively engaged on the journal pin, detachable prongs carried by said yoke and each including a body portion having an incurved bend defining sockets and arms provided with milled ends constituting points, certain of said sockets receiving the arms of the yoke, an eye bolt carried by the yoke and having a shank received in another of said sockets and a nut threaded on said shank and seated against the incurved bends.

2. In an animal poke, a collar, pivot bearings carried by said collar, a yoke operatively arranged on said pivot bearings and including a body and arms and a detachable prong including a body portion having an incurved end defining sockets and arms having pointed ends, and securing means for said detachable prong including an eye bolt carried by the yoke and having a shank extending through one of the sockets of the prong, the other sockets of the prong receiving the arms of the yoke, a nut carried by the shank of the eye bolt and seated against the incurved bend of the prong.

3. In an animal poke, a collar, pivot bearings carried by the collar, a yoke pivotally mounted upon the collar and including a body having an extension and arms, and a detachable prong having a body portion provided with an incurved bend defining sockets and legs, an eye bolt including an eye slidably arranged on the extension of the yoke and a shank extending through one of the sockets of the prong, the other sockets of the prong receiving the arms of the yoke and a nut engaged with the shank of the eye bolt and seated against the incurved bend of the detachable prong.

B FRED. C. MORRIS.